United States Patent Office 3,053,869
Patented Sept. 11, 1962

3,053,869
CARBOXYLIC ACIDS
Charles G. McAlister, Robert J. Lee, and Harmon M. Knight, La Marque, Tex., assignors, by mesne assignments, to Standard Oil Company, Chicago, Ill., a corporation of Indiana
No Drawing. Filed Dec. 31, 1959, Ser. No. 863,083
14 Claims. (Cl. 260—413)

This invention relates to the production of carboxylic acids from olefins and more specifically pertains to the production of carboxylic acids from olefins employing a novel catalyst.

It has been known for some time that fatty acids can be produced by high pressure synthesis from olefins, carbon monoxide and water in the presence of a variety of catalysts. The earliest development with respect to the preparation of carboxylic acids from olefins, carbon monoxide and water and nearest to the process of this invention is described in U.S. Patent No. 1,924,766 and later patents of the same assignee. In general, the high pressure reaction is carried out at substantially higher temperatures than are employed in the oxo-synthesis. The temperatures are in the range of 300 to 400° C. with pressures of from 200 to 1000 atmospheres. The process requires the use of an acid catalyst which under these severe conditions necessitates the use of materials of construction which are highly resistant to high pressure and the highly corrosive effects of the reaction system. The use of silver and silver alloys for reaction vessels for this process has been patented. The catalysts proposed for this process of U.S. Patent No. 1,924,766 and the related patents include phosphoric acid, hydrochloric acid, sulfuric acid, boron trifluoride, etc. For example, by this process propionic acid is produced from ethylene, isobutyric acid from propylene, and trimethyl acetic acid from 2-butene by rearrangement in the carbon chain. This synthesis route for the preparation of potentially inexpensive lower fatty acids has never been put into commercial practice even though the route appears to be exceedingly simple. The major drawbacks to commercial application of this synthesis have been due to the exceedingly strong corrosive action of the acid catalysts proposed under the required, severe pressure and temperature conditions as well as the necessary high temperatures and pressures.

Recently there has been discovered a milder synthesis route for the preparation of fatty acids from olefins, carbon monoxide and without added water using such acid catalysts which have a pronounced dehydration action as substantially water-free sulfuric acid of at least 90% $H_2SO_4$ strength and preferably 96% $H_2SO_4$, anhydrous hydrogen fluoride, anhydrous chlorosulfonic acid and anhydrous hydrogen fluoride with the addition of boron fluoride. These acids are employed in amounts substantially greater than stoichiometric proportions. The reaction mixture is taken up with water and the carboxylic acid is recovered. This process is described in U.S. Patent No. 2,831,877, issued April 22, 1958, to Herbert Koch. In the process developed by Koch the reaction is carried out at temperatures of 0° C. or lower to 100° C. When using sulfuric acids, the patentee states that it is advantageous to employ temperatures in the range of from −30° C. to +50° C. Pressures of 200 to 500 atmospheres are said to offer no advantage over useful pressures up to 100 atmospheres, with 20 to 50 atmospheres being preferred.

When the process developed by Patentee Koch is employed using sulfuric acid, the taking up of the reaction mixture with water does provide an organic layer containing the fatty acid but also results in the formation of dilute sulfuric acid. This drawback was recognized by Patentee Koch and co-worker Huisken in developing their process using monohydroxy fluoboric acid, $H(BF_3OH)$, or its complexes with inorganic acids such as phosphoric acid or sulfuric acid described in U.S. Patent 2,876,241. In this process it is not necessary to take up the reaction mixture in a large amount of water. Rather, only a stoichiometric amount of water is added to the reaction mixture to effect the separation of the catalyst from the carboxylic acid. It is said that the catalyst can be reused. This catalyzed synthesis of fatty acids from olefins and carbon monoxide requires only mild conditions of temperature and pressure, such as −10° to 100° C. and pressures up to 100 atmospheres. In this process the amount of catalyst employed is from 1 to 2 parts by weight per part by weight of olefin charge. In spite of the fact that the catalyst can be recycled many times (reuse up to ten times is illustrated in the patent), this process has not been accepted as a commercial process. This catalyst is still very expensive and considerable losses thereof result due to the solubility of the catalyst in the aliphatic acid phase in the process of springing these acids. Moreover, the yields are not good probably because of incomplete separation of the aliphatic acids when only the stoichiometric amount of water is added.

We have discovered a process for the preparation of fatty acids from carbon monoxide and an olefin of 3 to 20 carbon atoms under mild reaction conditions; i.e., temperatures not exceeding 100° C. and pressures no higher than 100 atmospheres, using as the catalyst spent alkylation acid. Spent alkylation acid is essentially a petroleum refinery waste stream whose principal use is a feed to a system for recovery of sulfuric acid values therefrom by a thermal decomposition process such as heating in admixture with fine coke particles to liberate $SO_2$ which is dried and charged to a catalytic sulfuric acid process.

Spent alkylation acid is obtained as the result of alkylating olefins with isoparaffins in the presence of concentrated sulfuric acid of no less than 89% $H_2SO_4$. Such a process is well known to those skilled in the art. The acid withdrawn from such an alkylation process may have an $H_2SO_4$ content of from 80 to 95% total titratable acidity as $H_2SO_4$, more usually it contains not more than about 90% $H_2SO_4$ on the same basis, and is unsuitable for further use as an alkylation catalyst. Hence, it is known as spent alkylation acid. Although spent alkylation acid may contain 80 to 90% $H_2SO_4$ on the basis of total titratable acidity, it is recognized by those skilled in the art as being quite different from 80 to 90% fresh sulfuric acid, for such a fresh sulfuric acid contains water as the only other principal ingredient in an amount of from 10 to 20%. Spent alkylation acid on the other hand, while containing 80 to 90% $H_2SO_4$ on the above basis, contains only from 1 to 5% water with the remainder being "red oils" which are complex mixtures of polyolefins, organic sulfates and sulfonates. The free $H_2SO_4$ content of spent alkylation acid as determined by the aniline method will be 5 to 7% below the total titratable acidity concentration. The basis for the $H_2SO_4$ content of spent alkylation acid will be hereinafter designated in the specification and claims as "total titratable" or "free $H_2SO_4$" consistent with the above descriptions of the determination of such concentration measurements.

The process of this invention is applicable for the preparation of carboxylic acids from such olefins as simple alkenes; i.e., straight and branched chain, terminal and internal unsaturated alkenes, cyclic olefins, diolefins, and unsaturated difunctional compounds such as unsaturated carboxylic acids from which dicarboxylic acids are prepared among others. The olefin reactant employed may be a single normal olefin, or such branched chain olefins as the liquid polymers of propylene containing 5 to 20 carbon atoms and copolymers of propylene and butylene containing 5 to 20 carbon atoms, a mixture of the foregoing olefins, or mixtures of olefins with saturated hydrocarbons or other inert solvents such as in a catalytic gasoline containing 50% olefins. In general, olefins containing 3 to 20 carbon atoms and especially branched chain olefins of 5 to 20 carbon atoms are preferred.

and even the superiority of the process of this invention over the use of fresh sulfuric acid of 98% $H_2SO_4$ content, the following side by side comparison is given in Table I. In each case the mole ratio of $H_2SO_4$ is substantially 2 to 1, and the reaction times (5–6 hours) are substantially constant.

*Table I*

YIELD DATA COMPARISONS FOR REACTION OF PENTENE-1 WITH CARBON MONOXIDE

| Type | Sulfuric acid catalyst, weight percent | | | | Molar charge ratio [1] $H_2SO_4$/olefin | Reaction temp., °C | Yield of aliphatic acid | | Weight percent polymer |
| --- | --- | --- | --- | --- | --- | --- | --- | --- | --- |
| | Free $H_2SO_4$ | Titratable acidity | $H_2O$ | Organics | | | Weight percent | Mole percent as $C_6$ | |
| Fresh | 98.2 | 98.2 | 1.8 | 0 | 1.99 | 19–20 | 55.5 | 33.5 | |
| Do | 98.2 | 98.2 | 1.8 | 0 | 1.94 | 17–23 | 52.1 | 31.5 | |
| Do | 94.0 | 94.0 | 6.0 | 0 | 2.06 | 19–21 | 74.8 | 45.2 | 28 |
| Do | 94.0 | 94.0 | 6.0 | 0 | 2.05 | 43–47 | 96.4 | 58.2 | 9.2 |
| Do | 90.2 | 90.2 | 9.8 | 0 | 2.0 | 18–23 | 33.6 | 23.1 | |
| Do | 87.0 | 87.0 | 13.0 | 0 | 1.97 | 17–23 | 7.2 | 4.3 | |
| Spent alkylation acid | | 89.3 | 3.9 | 4.04 | 2.0 | 20 | 50.5 | 30.6 | 30.9 |
| Do | | | | | 2.05 | 40 | 67.4 | 40.6 | 13.5 |
| Do | 81.6 | 88.7 | 3.98 | 4.98 | 2.0 | 38–41 | 62.7 | 37.9 | 14.9 |
| Do | 79.5 | 85.9 | 5.97 | 4.88 | [2] 1.98 (1.84) | 38–41 | 72.1 | 43.5 | 17.0 |
| Do | 79.5 | 85.9 | 5.97 | 4.88 | [2] 2.93 (2.71) | 40 | 99.4 | 60.0 | 7.3 |
| Do | 81.9 | 87.9 | 3.6 | 5.1 | 2.05 | 44–46 | 63.9 | 38.6 | 13.0 |
| Do | 83.1 | 89.5 | 3.8 | 4.6 | 2.04 | 43–46 | 67.4 | 40.7 | 11.2 |

[1] Mole ratio based on titratable acidity calculated as $H_2SO_4$.
[2] Mole ratio "free $H_2SO_4$"/olefin.

More specifically, the process of this invention comprises adding the olefin to stirred, spent alkylation acid at reaction temperature pressurized with CO. The mole ratio of spent alkylation acid employed is at least one mole $H_2SO_4$ per mole of olefin and may be as high as 100 or more moles of $H_2SO_4$ per mole of olefin. The reaction mixture is maintained at a temperature in the range of −10 to 100° C. The reaction pressure employed is 10 to 100 atmospheres of carbon monoxide. The mixture resulting is held for 5 to 30 minutes after all the olefin has been added. The resulting mixture is depressurized, and water is added until the titratable acidity of the aqueous layer is between 65–75% and preferably 70–72% by weight, calculated as $H_2SO_4$. The temperature during dilution is controlled to not exceed about 60° C. The organic phase is separated from the aqueous phase and the fatty acid is recovered from the organic phase. Recovery of the fatty acid product may be accomplished by extraction, distillation, converting the fatty acid to a soap and extracting the soap with water or other solvent and springing the acid from its soap, and other methods understood by those skilled in the art. While mole ratios of up to 100 moles of $H_2SO_4$ per mole of olefin can be employed, little advantage is gained by employing more than 10 moles per mole. Satisfactory yields of fatty acids can be obtained for commercial operation by employing less than 10 moles $H_2SO_4$ per mole of olefin, and preferably the mole ratio is in the range of 1.5 to 5 moles per mole of olefin. The reaction temperature need not exceed 100° C., so temperatures in the range of from −10° to 100° C. will be useful with temperatures in the range of 20–45° C. being preferred. As hereinbefore stated, the CO pressure need not exceed 100 atmospheres and pressures in the range of from 10 to 50 atmospheres are advantageously employed.

Under such mild reaction conditions it is indeed surprising that the process of this invention employing a spent alkylation catalyst of substantially less than 90% $H_2SO_4$ content will produce results which compare favorably with those obtained with fresh sulfuric acid of more than 90% $H_2SO_4$ as required by U.S. Patent No. 2,831,877. In this patent it is disclosed that patentee found that the use of sulfuric acid of 92% $H_2SO_4$ content or less, greatly reduced the yields of the fatty acid while the use of sulfuric acid of 95% or more $H_2SO_4$ resulted in a substantial increase in fatty acid yield. To illustrate the equality The data in Table I indicate that spent alkylation acid differs in kind from fresh sulfuric acid in catalyzing the reaction of an olefin with carbon monoxide, for although its $H_2SO_4$ content is well below 90% strength referred to in U.S. Patent 2,831,877 as an absolute minimum, it is equal to if not somewhat superior to the use of fresh sulfuric acid of 98% $H_2SO_4$ which, according to said patent, is about optimum concentration with respect to yield of carboxylic acid.

The process of this invention is exceedingly mild and can be carried out in stainless steel reaction vessel, for example a vessel fabricated from 316 stainless steel is satisfactory. If desired, a glass-lined reaction vessel can be employed and reaction vessels of other corrosion-resistant alloys can be used. However, the use of any particular material of construction is not essential or critical to the process of this invention.

The process of this invention may be carried out by admixing the spent alkylation acid and olefin and pressurizing the mixture with carbon monoxide. Also, the olefin admixed with carbon monoxide can be fed into the spent alkylation acid. Preferably the process is conducted by pressurizing the spent alkylation catalyst with carbon monoxide and then adding the olefin, while agitating vigorously.

The process of this invention differs markedly in an additional respect to that disclosed in U.S. Patent 2,831,877 in that the amount of water added to spring the carboxylic acid is far less. In the present process the amount of added water is only that needed to dilute the aqueous phase to a $H_2SO_4$ content, determined as total titratable acidity, of no lower than 65% and preferably 70–72% $H_2SO_4$. Whereas according to U.S. Patent 2,831,877, the reaction mixture is taken up with sufficient water to dilute the sulfuric acid to 30–40% of $H_2SO_4$ content. The spent alkylation acid diluted according to the process of this invention to a titratable acidity (calculated as $H_2SO_4$) of not less than 65% and preferably 70–72% can still be charged to a process for recovering the $H_2SO_4$ values and regenerating fresh sulfuric acid as hereinbefore described. An added advantage of this controlled dilution procedure is the fact that the recovered aliphatic acid contains much less organic polymers and is easier to purify to a high quality product.

The reaction of an olefin with carbon monoxide has been regarded from an over-all consideration as the reaction of an olefin and formic acid, with the latter formed by the interaction of water with carbon monoxide. According to a modification of the process of this invention, the olefinic compound is reacted with formic acid in the presence of spent alkylation acid to produce the carboxylic acid.

To illustrate the mode of operating according to the process of this invention, the following detailed examples are given. In these examples a 316 stainless steel autoclave equipped with an internal cooling coil, baffles, an efficient stirrer and a dip-tube for introducing olefin below the spent alkylation acid surface is employed. Olefin from a weighed reservoir is pumped into the autoclave.

EXAMPLE I

Spent alkylation acid containing 83.1 wt. percent free $H_2SO_4$, 4% water, 5% red oil, and having a total titratable acidity of 89.5% wt. percent and a specific gravity of 1.7170 at 20° C. is charged to the autoclave in an amount (2,954 grams) to provide 25 gram moles $H_2SO_4$. The autoclave is closed. The spent alkylation acid is stirred and maintained at a temperature of 20–21° C. and pressured with carbon monoxide to 400 p.s.i.g. (about 27 to 28 atmospheres). Pentene-1 is pumped into the autoclave over a six-hour period until 9.1 moles (635 grams) are added, which is equivalent to a mole ratio of "free $H_2SO_4$"/pentene-1 of 2.75. The reaction temperature is maintained in the range of 20 to 21° C. during the olefin addition while the reaction mixture is stirred. Stirring is continued for 15 minutes after all the olefin is added. The recovered reaction mixture weighed 3,589 grams which indicates that approximately 130 grams of CO (plus the amount of handling losses) is taken up by the olefin. The stirred de-pressurized reaction mixture is cooled to 10° C. and there is added 2,700 grams of water to provide an aqueous phase of about 45% titratable acidity. The mixture is maintained at 30° C. during the addition of water. Heptane in an amount equal to about one-half the volume of the olefin charged is added and thoroughly mixed with the diluted reaction mixture. Stirring is stopped. Two phases form. The lower aqueous phase is withdrawn. The heptane phase, containing the organic acids, is washed with 5 vol. percent of water and then three times with 5 vol. percent of a 10% sodium bicarbonate solution in order to remove the sulfuric acid, sulfur dioxide, and the like which are present in this phase.

The organic acids in the heptane phase are taken up in 3,220 ml. of aqueous sodium hydroxide (7 wt. percent NaOH concentration). The sodium hydroxide solution is then extracted several times with 200-ml. quantities of benzene to remove nonacidic organic polymers. The sodium soap solution is next acidified with hydrochloric acid to spring the free aliphatic carboxylic acids. The aqueous phase is extracted with a small amount (5%) of benzene, and the benzene washings are combined with the aliphatic acid phase. Benzene and a water azeotrope are distilled off. The remaining aliphatic acids weighed 598 grams. These are fractionated at atmospheric pressure through a 12 inch Vigreaux column yielding 571 grams of $C_6$ acid boiling between 180–200° C. (largely 185–190° C.), and 27 grams of higher boiling acids. The $C_6$ acid product contained 85–90% of 2,2-dimethylbutyric acid as determined by gas chromatographic analysis. The yield of total $C_6$ acid is 54.3 mole percent or 90.0 wt. percent, based on the pentene-1 charged. The yield of polymer, after correction for the "red oils" present in the spent alkylation acid, amounted to 8.5 wt. percent based on the olefin charged.

A similar run was made at a 2.32 mole ratio of "free $H_2SO_4$"/pentene-1. In this run, 2,490 grams of spent alkylation acid (83 wt. percent free $H_2SO_4$) was charged to the autoclave, and 634 grams of pentene-1 was added over a six-hour period. A carbon monoxide pressure of 400 p.s.i. and a temperature of 20° C. were maintained in identical fashion to the previous run. The total aliphatic acid product amounted to 503 grams, of which 473 grams was $C_6$ acid. The yield of $C_6$ acid was 45.0 mole percent and the yield of polymer (corrected) was 16 wt. percent based on pentene-1 charged.

In a third run in this series, the mole ratio of "free $H_2SO_4$"/pentene-1 was reduced to 1.85. In this run, 1,985 grams of spent alkylation acid was charged to the autoclave, and 638 grams of pentene-1 was added over a six-hour period while maintaining 400 p.s.i. carbon monoxide pressure in the autoclave. The product was worked up in the same manner as the two previous runs, yielding 370 grams of aliphatic acids of which 359 grams was $C_6$ acid. The yield of $C_6$ acid was 34.0 mole percent and the yield of polymer (corrected) was 23.5 wt. percent based on the olefin charged.

The results from this series of three runs are summarized in Table II.

*Table II*

PRODUCTION OF ALIPHATIC ACIDS FROM PENTENE-1 AND CO USING SPENT ALKYLATION ACID AS THE CONDENSING AGENT

Temperature: 20° C. CO pressure: 400 p.s.i.

| Mole ratio "free $H_2SO_4$" to olefin | Total yield of aliphatic acids, weight percent based on pentene-1 charge | Weight percent yield of $C_6$ acid based on pentene-1 charge | Mole percent yield of $C_6$ acid | Weight percent yield of polymer (corrected) [1] |
|---|---|---|---|---|
| 2.75 | 94.3 | 90.0 | 54.3 | 8.5 |
| 2.32 | 79.4 | 74.8 | 45.0 | 16.0 |
| 1.85 | 58.0 | 56.3 | 34.0 | 23.5 |

[1] Polymer yield corrected for the polymer (red oil) present in the spent alkylation acid used in the runs.

EXAMPLE II $C_{10}$ aliphatic acids are made in high yield by the reaction of branched chain nonenes with carbon monoxide using spent alkylation acid as the condensing agent. The nonene charge stock, also known as propylene trimer, is produced by the polymerization of propylene over a phosphoric acid/kieselguhr catalyst.

Spent alkylation acid (11,816 grams), having a total titratable acidity of 89 wt. percent (as $H_2SO_4$) and a free $H_2SO_4$ content of 83 wt. percent, is charged to a five-gallon stainless steel autoclave equipped with a Dispersimax agitator. The autoclave is pressured to 400 p.s.i. with carbon monoxide and maintained at 390–410 p.s.i. throughout the run by intermittent addition of carbon monoxide. Nonene (36.2 moles or 4,560 grams) is pumped into the reactor over a 2.3-hour period, while maintaining the reactor temperature at 35–45° C. These quantities of reactants are equivalent to a mole ratio of "free $H_2SO_4$" to olefin of 2.75 and a weight ratio of 2.59. After twenty minutes of additional stirring, the reactor is depressured and the product discharged. The recovered product weighs 17,090 grams. There is a gain in weight of 714 grams as a result of the reaction with carbon monoxide. The reaction product is washed with 1,000 ml. of n-pentane, and a small amount of saturated hydrocarbons (209 grams) is recovered after stripping off the pentane solvent.

The product from the run was divided into four parts. These aliquots were diluted with water to different levels in order to determine the optimum minimum amount of water for hydrolysis of the reaction mixture and recovery of the aliphatic acid product therefrom. The amounts of water added were 80, 122, 161, and 659 parts by weight per 1,000 parts of reaction product in the four different cases. The water was added in the form of ice so as to better control the exothermic hydrolysis reaction and to keep the hydrolysis temperature from exceeding 60° C. The mixture was stirred vigorously during addition of the water (ice). Heptane solvent was then added (20 vol. percent) to extract the aliphatic acid product from the diluted sulfuric acid phase. The heptane-organic acid phase was washed twice with water using 5–7 volume percent of water each time, and then was washed three times with 5 volume percent of saturated sodium bicarbonate solution to remove the residual sulfuric acid, sulfur dioxide, and related compounds. After a final water wash, the heptane-organic acid phase was distilled to 245° C. pot temperature to remove the heptane. The crude aliphatic acid product was weighed and the acid content determined by titration. The yields and properties of the product from the four dilution experiments are shown in the following Table III.

*Table III*

WORK-UP OF REACTION PRODUCT FROM NONENE-CO-SPENT ALKY. ACID RUN

| Grams of water added per 1,000 gm. reaction product | Titratable acidity of the sulfuric acid phase after dilution with water, expressed as weight percent $H_2SO_4$ | Moles of water (total) per mole of "Free $H_2SO_4$" charge | Crude aliphatic acid product, grams recovered per 1,000 gm. of reaction product | Color of the crude product, Gardner | Composition of crude acids | | Mole percent yield of aliphatic acids (as $C_{10}$) based on nonene charge |
|---|---|---|---|---|---|---|---|
| | | | | | Weight percent aliphatic acids | Weight percent polymer | |
| 80 | 73.7 | 1.03 | 245 | 12 | 86 | 14 | 59.0 |
| 122 | 71.8 | 1.44 | 269 | 14 | 87 | 13 | 65.5 |
| 161 | 70.4 | 1.83 | 282 | 15 | 84 | 16 | 66.0 |
| 659 | 46.6 | 6.63 | 320 | 18+ | 72 | 28 | 64.4 |

It was found that maximum recovery of the aliphatic acid product and minimum contamination with polymers were obtained when the reaction product was diluted with 122 to 161 parts of water per 1,000 parts of product. When less water was used, the recovery of the aliphatic acid product was lower. When a large amount of water was used so as to dilute the sulfuric acid phase to 46% titratable acidity, the recovery of the aliphatic acid product was slightly lower, the product was contaminated with twice as much polymer, and the color of the recovered material was much darker.

The crude acid product recovered by dilution with 122 and 161 parts of water, respectively, per 1,000 parts was combined and worked up to separate the aliphatic acids from the polymer. The crude product (2,547 grams) was dissolved in 2,000 ml. of benzene. This solution was shaken with aqueous ammonium hydroxide (4,777 grams of 9.45 wt. percent of $NH_4OH$) to extract the aliphatic acid in the form of its ammonium salt. The ammonium salt solution was extracted five times with benzene (1,000 ml. each time) to remove the last traces of dissolved polymers. The ammonium salt solution was then acidified by adding 1,275 grams of 37% hydrochloric acids to spring the aliphatic acids. The free aliphatic acid phase which separated from the aqueous phase was a light straw color. The aqueous phase was extracted one time with 800 ml. of benzene and the benzene wash was combined with the aliphatic acid phase. This mixture was then distilled to remove the benzene and dissolved water. The recovered aliphatic acids weighed 2,156 grams. This represents a 63.5 mole percent yield of recovered pure aliphatic acids (calculated as $C_{10}$ acids) based on the nonene charge.

The purified aliphatic acids were fractionated through a 1″ x 24″ packed column at 50 mm. Hg pressure and 3:1 reflux ratio. The product distribution is shown as follows.

| Aliphatic acid fraction | Boiling range at 50 mm., ° C. | $n_D^{25}$ | Weight percent of acid product |
|---|---|---|---|
| $C_6$ | 90–121 | | 1.1 |
| $C_7$ | 121–138 | | 0.5 |
| $C_8$ | 138–152 | | 1.5 |
| $C_9$ | 152–164 | 1.4314 | 2.6 |
| $C_{10}$ | [1] 164–179 | 1.4365 | 77.5 |
| $C_{11}$ | 179–185 | 1.4420 | 2.3 |
| $C_{12}$ | 186–199 | 1.4485 | 2.1 |
| $C_{13}+$ | Above 200 | | 12.4 |
| | | | 100.0 |

[1] Mostly 168–171.

The $C_{10}$ aliphatic acid product was nearly water-white in color (less than 1 on the Gardner scale), was practically free of odor, and had a purity of 99.5% by titration.

EXAMPLE III

The same equipment and reactants, described in Example II, were used in a parallel experiment in which the reaction time was only 25 minutes over-all. Spent alkylation acid (11,840 grams) was charged to the autoclave and pressured to 400 p.s.i. with carbon monoxide. The agitator was started and the nonene (4,064 grams) was pumped into the reactor in a twenty-minute period. The reaction temperature was 35–43° C. Stirring was continued for an additional five minutes. The reactor was then de-pressured and the product removed. The reaction product weighed 16,536 grams, showing a net gain of 632 grams from the reaction with carbon monoxide. The product was worked up as in Example II, by diluting with 122 parts of water per 1,000 parts of reaction product. The titratable acidity of the sulfuric acid phase, after dilution and separation of the organic phase, was 69.6 wt. percent calculated as $H_2SO_4$.

The heptane-organic phase was washed with water and sodium bicarbonate and heptane removed by distillation. The crude aliphatic acid product amounted to 2,640 grams, which was shown by titration to contain 69 wt. percent aliphatic acids and 31% polymer. Thus, the yield of aliphatic acids was 32.8 mole percent (calculated as $C_{10}$) or 44.8 wt. percent based on the nonene charge.

We have found that the use of fresh sulfuric acid of about 94% $H_2SO_4$ concentration as a catalyst for the preparation of aliphatic acids by the reaction of an olefin with carbon monoxide according to the process of U.S. Patent 2,831,877 is the optimum concentration especially for a mole ratio of $H_2SO_4$ to olefin over the range of 2 to 4. Under these conditions the yield of aliphatic acid per unit volume of the reaction vessel is maximized. When spent alkylation acid is employed as the catalyst according to our invention, the same mole ratio of $H_2SO_4$ to olefin results in a lower mole percent yield than when fresh sulfuric acid is employed. For example, using fresh 94% sulfuric acid and pentene-1 in the mole ratio of 2 moles $H_2SO_4$ per mole of olefin, a 58 mole percent yield of aliphatic acid is obtained. Using spent alkylation acid in the mole ratio of 2 moles $H_2SO_4$ per mole of pentene-1, and at the preferred reaction temperature of 35–45° C., the aliphatic acid yield is 37 to 41 mole percent. However, by increasing the amount of spent alkylation acid to a mole ratio of $H_2SO_4$ to pentene-1 in the range of from 2.7 to 3.0, a 55 mole percent yield of aliphatic acids is obtained. A mole ratio of beyond about 3.0 results in substantially increased yields; e.g., 4 moles $H_2SO_4$ from spent alkylation acid per mole of pentene-1 results in a 67 mole percent yield.

We have also discovered that by increasing the water content of spent alkylation acid by the addition of 1.5–3% of water thereto, especially where the free $H_2SO_4$ content of the spent alkylation acid is 81 to 85 weight percent, the yield of aliphatic acid appears to increase by 5 to 6 mole percent at the same mole ratio of $H_2SO_4$ to olefin. Thus, in the above reaction of pentene-1 with CO where a spent alkylation acid of 82 weight percent free $H_2SO_4$ was used in a mole ratio of 2.75 to 3.0 moles per mole of pentene-1 to produce a 54–55 mole percent yield of aliphatic acids, by adding about 2% water to convert the free $H_2SO_4$ content to about 80 weight percent and employing the same mole ratio of $H_2SO_4$ to pentene-1, a yield of aliphatic acids of 60 mole percent is obtainable.

EXAMPLE IV

Following the operational procedure of Example I and employing a similar reaction vessel, 520 grams of a $C_5$ olefin rich cut (boiling I.B.P.: 40° C.) of light catalytic gasoline is reacted with carbon monoxide at 400 p.s.i.g. CO pressure in the presence of 980 grams of spent alkylation acid having 81.6 weight percent free $H_2SO_4$ and a total titratable acidity of 88.6%. The $C_5$ charge material contained 218 grams or 3.12 moles of olefins. The mole ratio of free $H_2SO_4$ to olefin is 2.60. The olefin is added at the rate of 0.092 mole per hour per hole $H_2SO_4$. The reaction temperature is maintained at 30° C. The reaction product was worked up in the same manner as in Example I, yielding 210 grams of aliphatic acids ($C_6$ to $C_9$), a 97.9 weight percent yield (based on olefin charged), of which 75% is $C_6$ acids.

EXAMPLES V TO XI

In a series of reactions involving the carbonylation of pentene-1 to illustrate the effect of mole ratio of free $H_2SO_4$ from spent alkylation acid and the addition of water thereto on the yields of $C_6$ acids, the procedure of Example I is repeated. The reaction pressure is constant for each reaction, 400 p.s.i.g. CO. The reaction temperature is constant, 39–42° C. The spent alkylation acid is from one source; i.e., one batch of spent alkylation acid, and contains 81 weight percent free $H_2SO_4$, 4% water and 5% red oils. The rate of addition of pentene-1 in moles per hour per mole of free $H_2SO_4$ is constant for each reaction. The amounts of reactants, free $H_2SO_4$ concentration, mole ratio of free $H_2SO_4$ to pentene-1 (A/P), yield of $C_6$ acids and weight of polymeric material produced (corrected for red oils present), are shown in Table III. Water is added to the spent alkylation acid to obtain the lower free $H_2SO_4$ concentrations for Examples V to XI.

*Table III*

CARBONYLATION OF PENTENE-1

| | Ex. V | Ex. VI | Ex. VII | Ex. VIII | Ex. IX | Ex. X | Ex. XI |
|---|---|---|---|---|---|---|---|
| Mole ratio A/P | 1.84 | 1.83 | 1.83 | 2.15 | 2.71 | 3.27 | 3.69 |
| Free $H_2SO_4$, weight percent | 81 | 79.5 | 79.0 | 79.5 | 79.5 | 79.5 | 79.5 |
| Pentene-1, grams | 308 | 310 | 310 | 264 | 210 | 179 | 153 |
| $C_6$ acid yields: | | | | | | | |
| Grams | 198.1 | 223.6 | 213.8 | 211.8 | 208.6 | 186.6 | 170.6 |
| Mole percent | 37.9 | 43.5 | 41.6 | 48.4 | 60.0 | 63.0 | 67.4 |
| Weight percent | 62.7 | 72.1 | 69.0 | 80.2 | 99.3 | 104.2 | 111.6 |
| Polymer, corrected | 14.9 | 17.0 | 19.2 | 11.3 | 7.3 | 5.7 | 4.6 |

As the mole ratio of free $H_2SO_4$ to pentene-1 increases, the yield of $C_6$ acids increases and the polymer formation advantageously decreases. When the concentration of free $H_2SO_4$ in spent alkylation acid is reduced by the addition of water (Examples VI and VII), the yield of $C_6$ acids increases. Polymer formation, when employing fresh sulfuric acid of 94% $H_2SO_4$ as the catalyst for the carbonylation of pentene-1, has varied from as high as 28% to about 6% corrected for organic sulfates and sulfonates over an $H_2SO_4$ to pentene-1 mole ratio of from 1.5 to 6.2 at the same reaction conditions, 400 p.s.i.g. CO pressure and 40° C., with the polymer formation tending to decrease as the mole ratio of $H_2SO_4$ to pentene-1 increases.

EXAMPLE XII

The procedure of Example I is employed for the carbonylation of hexene-1 using spent alkylation acid of 89.6% $H_2SO_4$ (total titratable acidity). The reaction temperature is 20–22° C. and the CO pressure is 410 p.s.i.g. The mole ratio of $H_2SO_4$ to hexene-1 is 2.4. By this process a 62.3 mole percent yield of heptanoic acid is obtained. At 21 to 27° C. and 360 p.s.i.g. CO pressure a 62.5 mole percent yield of heptanoic acid is obtained.

EXAMPLE XIII

The procedure of Example I is employed for the carbonylation of heptene-1 to produce octanoic acid. Spent alkylation acid of 89.6% $H_2SO_4$ (total titratable acidity) is employed as the catalyst. At an $H_2SO_4$ to olefin mole ratio of 4.1, a temperature of 27 to 30° C. and a pressure of 400 p.s.i.g. CO, there is obtained a 75.6 mole percent yield of octanoic acid.

EXAMPLE XIV

The procedure of Example I is employed for the carbonylation of octene-1 to produce nonoic acid using spent alkylation acid of 89.6% $H_2SO_4$ (total titratable acidity). The reaction temperature is 21 to 27° C. and the pressure is 390 p.s.i.g. CO. At an $H_2SO_4$ to olefin mole ratio of 3.3, the yield is 73.5 mole percent, and at a mole ratio of 3.1 the yield is 71.4 mole percent.

EXAMPLE XV

The procedure of Example I is employed for the carbonylation of propylene trimer to produce a mixture of $C_{10}$ aliphatic acids using spend alkylation acid of 85.3% $H_2SO_4$. The $H_2SO_4$ to olefin mole ratio is 2.7, the temperature is 10 to 15° C. and the pressure is 280 to 325 p.s.i.g. CO. By this process a 54.4 mole percent yield of the mixture of $C_{10}$ aliphatic acids is obtained. At 5 to 10° C. and a pressure of 215–265 p.s.i.g. CO a 58.7 mole percent yield of the mixture of $C_{10}$ aliphatic acids is obtained.

EXAMPLE XVI

Isobutyric acid may be prepared according to the procedure of Example I by the carbonylation of propylene employing spent alkylation acid of 78 to 89% free $H_2SO_4$ with mole ratios of $H_2SO_4$ to olefin of 2.5 to 3.0 $H_2SO_4$ to 1.0 olefin and temperatures of from −10 to 20° C. and CO pressures tof 250 to 400 p.s.i.g. in yields of 45 to 55 mole percent. At higher ratios of $H_2SO_4$ to olefine and temperatures of 25 to 35° C. the yields may be increased.

Spent alkylation acid may be employed as the catalyst to convert a cyclohexene fraction by carbonylation to methyl cyclopentane carboxylic acid and cyclohexane carboxylic acid as the main aliphatic acid products. The carbonylation of oleic acid in the presence of spent alkylation acid may be employed for the preparation of $C_{19}$ dicarboxylic acid. Also, carbonylation of 3-butenoic acid to a $C_5$ dicarboxylic acid may be carried out using spent alkylation acid as the catalyst. Diolefins such as butadiene can be converted to a mixture of products containing some polymeric dibasic acids.

Although the process of this invention has been illustrated by examples wherein reaction pressures of not above 400 p.s.i.g. CO were employed, such pressures are not to be construed as a limitation on the process of this invention. It has been found that the use of pressures of up to 1000 p.s.i.g. CO and higher give somewhat higher yields of aliphatic acids and at the same time reduce polymer formation. For example, the carbonylation of a $C_7$ olefin fraction carried out at 1000 p.s.i.g. CO pressure compared to the yield at 400 p.s.i.g. CO pressure using the same mole ratios of $H_2SO_4$ to olefin and the same reaction temperature results in about a 9% increase in yield and a decrease of about 33% in polymer formation.

The following data illustrate the quality of aliphatic acids obtainable from the process of this invention. All of these acids have a purity in excess of 99% of the theoretical acid number.

Table IV

| Aliphatic acid | Refractive index | Boiling range | APHA color | Iodine number | Weight percent sulfur |
|---|---|---|---|---|---|
| Trimethylacetic acid | 1.3966 at 30° C | 160–166 at 760 mm. Hg | 10 | | |
| $C_6$ acid | 1.4098 at 25° C | 185–190 at 760 mm. Hg | 5 | 0.05 | Nil |
| $C_7$ acid | 1.4188 at 25° C | 121–138 at 50 mm. Hg | 5 | | |
| $C_8$ acid | 1.4255 | 138–152 at 50 mm. Hg | 10 | 0.08 | 0.009 |
| $C_9$ acid | 1.4299 | 152–164 at 50 mm. Hg | 5 | | |
| $C_{10}$ acid | 1.4332–1.4365 | 164–179 at 50 mm. Hg | 20 | 0.12 | 0.014 |

What is claimed is:

1. A process for the preparation of a carboxylic acid which comprises reacting an olefinic compound with carbon monoxide in liquid phase in the presence of a catalyst comprising spent alkylation acid having a total titratable $H_2SO_4$ content of above 79% up to 90% by weight, and thereafter adding water to the reaction mixture formed to dilute the aqueous phase thereof to a titratable $H_2SO_4$ content in the range of 65 to 75% and recovering the carboxylic acid.

2. The process of claim 1 wherein the reaction is effected by adding the olefinic compound to a mixture of the spent alkylation acid and carbon monoxide.

3. The process of claim 1 wherein the olefinic compound is an aliphatic olefin.

4. The process of claim 1 wherein the olefinic compound is a mixture of aliphatic olefins in light catalytic gasoline.

5. The process of claim 1 wherein the olefinic compound is a cyclic olefin.

6. The process of claim 1 wherein the olefinic compound is a diolefin.

7. The process of claim 1 wherein the olefinic compound contains 3 to 20 carbon atoms.

8. The process of claim 1 wherein the olefinic compound is a branched chain olefin of from 3 to 20 carbon atoms.

9. The process of claim 1 wherein the reaction temperature is in the range of −10° to 100° C.

10. The process of claim 1 wherein the reaction pressure is up to 100 atmospheres.

11. The process of claim 1 wherein the reaction pressure is in the range of from 30 to 50 atmospheres.

12. The process of claim 1 wherein the spent alkylation acid has a free $H_2SO_4$ content in the range of 79–85% by weight and a total titratable acidity of 85–90% by weight calculated as $H_2SO_4$.

13. The process of claim 1 wherein the reaction of the olefin and carbon monoxide is carried out at 20° to 45° C.

14. The process of claim 13 wherein the mole ratio of $H_2SO_4$ to olefin is from 11.5 to 5.0.

References Cited in the file of this patent

UNITED STATES PATENTS

| | | |
|---|---|---|
| 2,831,877 | Koch et al. | Apr. 22, 1958 |
| 2,876,241 | Koch | Mar. 3, 1959 |

UNITED STATES PATENT OFFICE
CERTIFICATE OF CORRECTION

Patent No. 3,053,869                                September 11, 1962

Charles G. McAlister et al.

It is hereby certified that error appears in the above numbered patent requiring correction and that the said Letters Patent should read as corrected below.

Column 5, line 17, for "89.5%" read -- 89.5 --; column 7, in the table, third column, line 7 thereof, for "1.4485" read -- 1.4481 --; column 9, line 19, for "hole" read -- mole --; column 10, line 45, for "tof" read -- of --; line 46, for "olefine" read -- olefin --; column 12, line 28, for "11.5" read -- 1.5 --.

Signed and sealed this 22nd day of January 1963.

(SEAL)
Attest:

ERNEST W. SWIDER
Attesting Officer

DAVID L. LADD
Commissioner of Patents